United States Patent [19]

Fujii et al.

[11] Patent Number: 5,892,898
[45] Date of Patent: Apr. 6, 1999

[54] ERROR MANAGEMENT SYSTEM FOR SUPPORTING THE IDENTIFICATION AND LOGGING OF ERROR MESSAGES

[75] Inventors: Toshihisa Fujii; William L. Call; Abhijit P. Rane, all of Maricopa, Ariz.

[73] Assignee: Honeywell, Inc., Minneapolis, Minn.

[21] Appl. No.: 720,929

[22] Filed: Oct. 4, 1996

[51] Int. Cl.[6] ........................ G06F 11/00
[52] U.S. Cl. ........................ 395/185.1
[58] Field of Search ............ 395/185.01, 185.02, 395/183.01, 183.14, 183.15, 182.18; 707/202; 371/21.6

[56] References Cited

U.S. PATENT DOCUMENTS

| 5,237,677 | 8/1993 | Toshio et al. | |
|---|---|---|---|
| 5,237,684 | 8/1993 | Record et al. | 395/650 |
| 5,473,608 | 12/1995 | Gagne et al. | 370/85.3 |
| 5,621,892 | 4/1997 | Cook | 395/200.1 |
| 5,655,081 | 8/1997 | Bonnell et al. | 395/200.32 |

OTHER PUBLICATIONS

IBM Technical Disclosure Bulletin, entitled Enhanced Operator Error Processing by a Work Station Controller, vol. 34, No. 6, XP000228434, pp. 261–263 (Nov. 1, 1991).

Microsoft Windows NT Workstation Resources Kit, Microsoft Press, Redmond, Washington, US XP002050980, Chapter 37: "Monitoring Events" (1996).

Patent Abstracts of Japan, vol. 096, No. 004 (Apr. 30, 1996) and JP 07 334494 A (Fuji Xerox Co. Ltd.) (Dec. 22, 1995).

Research Disclosure, entitled *A Strategy for Handling Recoverable Errors Using Event Logs, Emsworth, GB*, No. 33546 (Mar. 1, 1992).

*Primary Examiner*—Albert Decady
*Attorney, Agent, or Firm*—Ohlandt, Greeley, Ruggiero & Perle

[57] ABSTRACT

There is provided an event management system and a storage media for identifying and logging event information for a plurality of loosely coupled subsystems. The event management system and the storage media include an application for reporting an event message in response to an occurrence of a particular event, and an event logging routine, responsive to receiving the error message, for identifying a source of the error message and for obtaining detailed error information for the error message at a time frame when the particular event occurs. In addition, the event management system and storage media include an event viewer for viewing the detailed error information.

13 Claims, 5 Drawing Sheets

ERROR MANAGEMENT SYSTEM FOR SUPPORTING THE IDENTIFICATION AND LOGGING OF ERROR MESSAGES

The present invention relates generally to systems that provide their users with explanations or descriptions for errors that occur during their operation. More particularly, the present invention relates to an error management system for supporting the identification and logging of error messages for a client/server environment.

BACKGROUND OF THE INVENTION

Existing operating systems include error handling tools that identify and log errors that occur during the operation of the operating systems and provide a user with the ability to view the logged errors. Although most applications running in the operating system's environment provide error messages when errors occur, these error messages are often technical in nature and may not be easily understood by the user. Therefore, the error handling tools not only identify and log these errors but, in addition, they describe the errors to the user in an easily comprehensible format. For example, the Windows NT® operating system by Microsoft Corporation includes an event log that collects error messages from applications, device drivers and the operating system itself to a common location that the user can access. The Windows NT® operating system also includes an event viewer that permits the user to view the error messages in the order of their occurrences.

The error handling tools of existing operating systems work fine for a self-contained environment, but do not operate well in a client/server environment having one or more client applications and service providers. In particular, the client application has the burden of understanding the error messages and to log a meaningful text for the message, but this task is difficult to manage in a client/server environment. If an error is encountered when the client application requests a service from a particular service provider, the service provider returns an error code that must be interpreted by the client application.

For existing error handling tools, the client application must have advance knowledge of the possible types of service failures. Otherwise, the client application would not be able to provide meaningful information regarding the nature of the error. This poses problems in a client-server environment because the client application and applications of the service providers are loosely coupled and developed independently, and it is not practical to change an application as its underlying service provider evolves. It is, therefore, difficult for a client application to obtain meaningful information for an error message within a client/server environment.

The present invention resolves the above problems by providing a mechanism for a client application that identifies the source of a service error and obtains detailed error information at the time the error occurs. In particular, the mechanism accesses the error message information specific to the service that encounters the error and, then, reports that information as part of its error handling operation. The present invention also functions in a plurality of nested subsystems in which a subsystem that detects a particular problem is identified among a group of subsystems that are called in a nested manner. Accordingly, the present invention automatically handles the operation of reporting events whose source subsystem is different from that of the reporting subsystem without requiring the reporting subsystem to have advance knowledge of the possible errors that could be encountered.

SUMMARY OF THE INVENTION

The present invention is an event management system and a storage media for identifying and logging event information for a plurality of subsystems which, in brief summary, comprises a means for reporting an event message in response to an occurrence of a particular event; a means, responsive to receiving the error message, for identifying a source of the error message, and a means for obtaining detailed error information for the error message at a time frame when the particular event occurs. The event management system and storage media also comprise a means for providing the detailed error information to an event viewer.

The event message corresponds to an event type that includes at least one event type selected from the group consisting of an information event type, a warning event type and an error event type. More specifically, the event type is an error event type used to report a non-recoverable problem.

The event management system includes a service routine for receiving logging information from a particular subsystem and handling a logging operation of another subsystem, and a definition table that defines a relationship between an identification of a particular subsystem and a message catalog associated with the particular subsystem. In addition, the message catalog includes a special event message for identifying logging information that does not originate from the particular subsystem.

The foregoing and still further objects and advantages of the present invention will be more apparent from the following detailed explanation of the preferred embodiments of the invention in connection with the accompanying drawings:

DETAILED DESCRIPTION OF THE PREFERRED EMBODIMENT

The present invention is a system for identifying the source of a service error and obtaining detailed error information when the error occurs. The error message information of the service error is accessed and reported as part of the system's error handling operation. Thus, the error information is available to the user when, at a subsequent time, the user requests the error information using an event viewer or the like.

Three basic types of events, namely information, warnings and errors, are logged for every application and operating system component. An information event is typically used to indicate the occurrence of an important activity, a warning event is used to indicate some kind of recoverable anomaly, and an error event is used to report a non-recoverable problem. Standard information is associated with each event type, and event-specific information may also be added.

Figure 1:
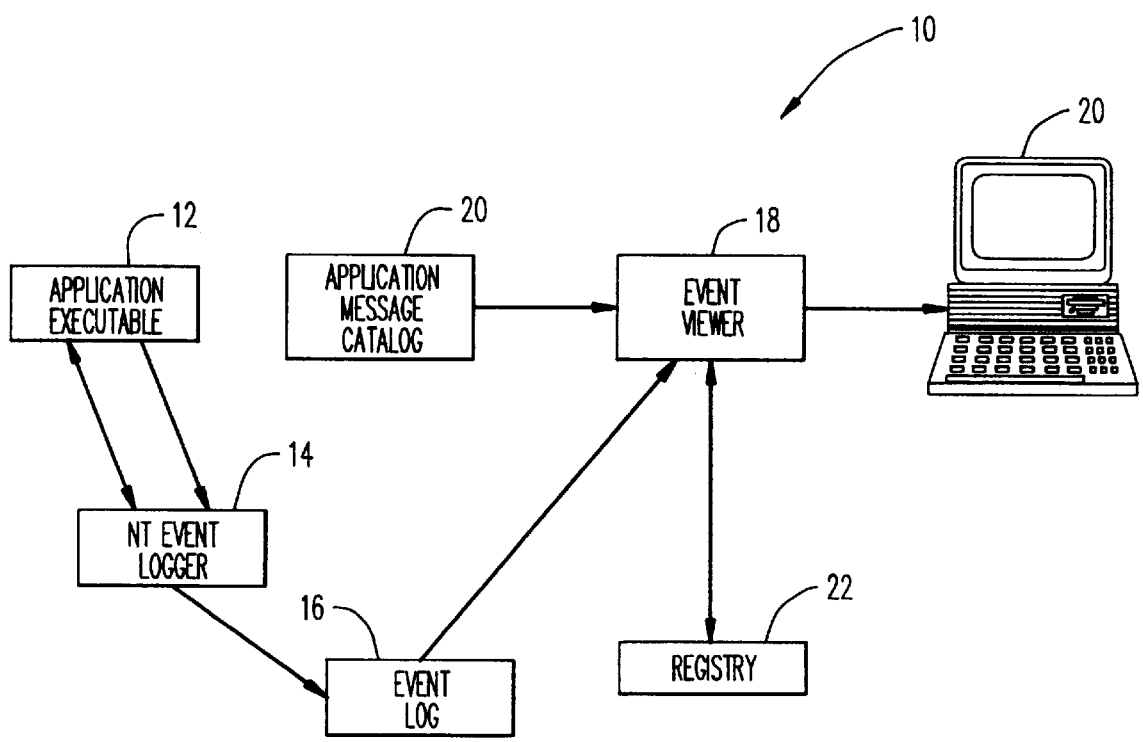
FIG. 1 is a block diagram of an error handling system of the prior art.

Referring to FIG. 1, there is shown an error handling system 10 of the prior art that includes logging functions that provide decoupled reporting services. Error handling system 10 includes an application 12, an event logger 14 and an event log 16. Application 12 is a self-contained application and, thus, is not part of a client/server environment. Generally, application 12 registers with event logger 14 and, then, receives a handle from the operating system which application 12 uses to identify itself when sending messages. As the application runs, it may encounter errors which it needs to report using the event logging service. To do so, it sends a message to the event logger 14 which contains the identifier to a text message in its message catalog 20. Event logger 14 then records the error in event log 16. Accordingly, throughout the operation of application 12, error codes that are identified by application 12 are recorded in event log 16.

To the contrary, conventional error message system included message catalogs that only contained event messages that the application had knowledge about in advance and had prepared for in advance. This necessity to have advance knowledge of the possible errors and to have set up a message catalog accordingly is one of the limitations which the present invention overcomes.

As shown in FIG. 1, an event viewer 18 may be used to read and filter events by event type, event category, and/or event source. The event source is a name describing the module that logged the event and is used to identify an application message catalog 20 which supplies message text to event viewer 18. Finally, the message text is expanded and displayed at a terminal 20, such as a personal computer or workstation, by event viewer 18. Also, a registry 22 communicates information to event viewer 18 that maps the event source to application message catalog 20.

Although error handling system 10 shown in FIG. 1 works fine for self-contained applications, it does not work well in client/server environments or nested subsystem situations. In particular, it is not practical to have application 12 track non-client errors or errors of other subsystems. In order to do so with error handling system 10, application 12 would have the burden of having advance knowledge of the types of service failures that can occur for those situations, and change as the underlying service or subsystem evolves.

Figure 2:
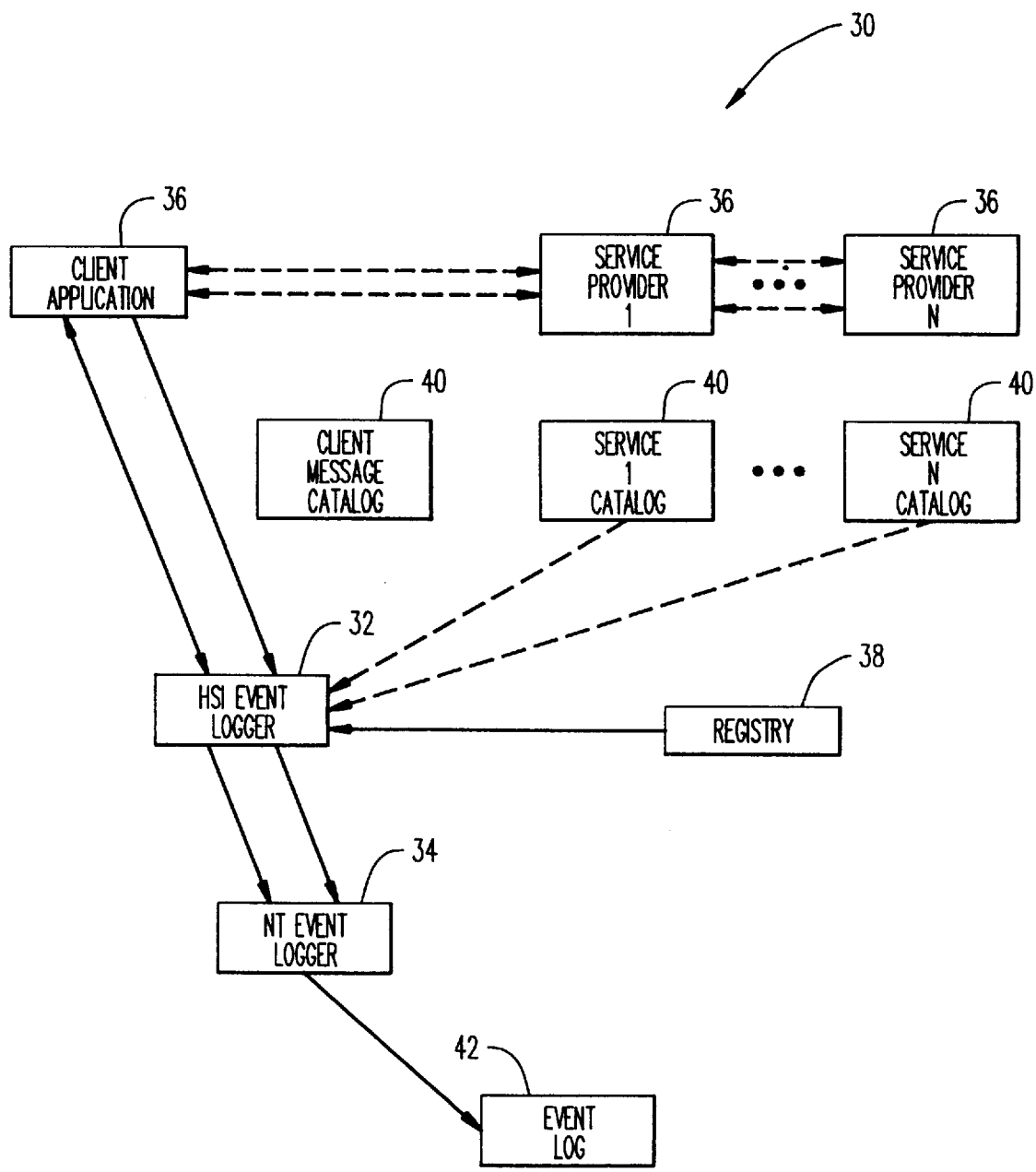
FIG. 2 is a block diagram of the preferred error management system in accordance with the present invention.

Referring to FIG. 2, there is provided an error management system of the preferred embodiment which is generally represented by reference numeral 30. The present invention automatically handles reporting of events in situations where the source subsystem is different from the reporting subsystem, such as a client/server relationship. Due to the complexity and difficulty of providing the reporting subsystem with advance knowledge, as described above in regard to FIG. 1, the preferred embodiment identifies the source of the error and obtains detailed error information at the time the error occurs.

As shown in FIG. 2, the preferred embodiment includes a new service routine or library that is situated between the client application and the event logger. In particular, error management system 30 comprises a service routine or library 32 that is situated between a submitter program 34 that logs events and a subsystem 36 that receives the logging services. For the preferred embodiment, service routine 32 is represented by the event logging routine, submitter program 34 is represented by the event logger, and subsystem 36 is represented by the application. Service routine 32 handles the operation of logging of the events of another subsystem. Error management system 30 also includes a definition table 38, represented by the registry, that defines the relationship between each subsystem ID that identifies a particular subsystem and the location of its associated message catalog. The registry provides a map for the subsystem ID to source name. In addition, each subsystem 36 has a corresponding error message catalog 40 containing information that may be logged to report errors that occur within its processing. Each message catalog 40 also has a special message, i.e., special event ID, used to identify cases where the information being logged is from a different subsystem 36 and, therefore, is not contained within its own message catalog 40. Also, an event log 42 collects log information from event logger 34.

Accordingly, the preferred embodiment 30 enables loosely coupled client/server applications to perform event logging with a service provider or subsystem 36 by capturing their error message at the time the error occurs and using their subsystem ID to record the message. In particular, event logging routine 32 receives the event ID from submitter program 34 and passes the subsystem ID of submitter program 34 and necessary information, i.e., string message, for the event. First, submitter program 34 registers its subsystem ID to the service routine. After that, if an error occurs, the submitter program 34 passes the error identification that includes the subsystem ID of subsystem 36 and its associated event ID in order to log the event.

Event logging routine 32 checks the passed subsystem ID. If the system ID matches that of the submitting program or subsystem 36, then the error information is resident within the subsystem's error message file and can be logged using normal error logging message calls. If, however, the error information shows that the error is associated with a different subsystem 36, event logging routine 32 accesses another subsystem's message catalog 40 using its definition table, retrieves the message for the passed event ID from the other subsystem's message catalog 40, and logs the special event ID above along with specifying another subsystem's ID and message as arguments. Thus, by logging the submitter program's special event ID, the event logging routine 32 recognizes that the source of the event is a particular submitter subsystem 36. In addition, the special message would indicate the source of the event and the message.

Each client application which provides a callable "server" which may return an error code to its requesting client application's needs to have a unique identifier or facility code. These ID's are numeric values in the range of hexadecimal 1 through FFF. In order to ensure the selected ID does not conflict with those in use by any other servers, they are recorded in a HSI file. Having selected a facility code, the server application developer uses the ID in his or her message catalog definitions.

Figure 3:
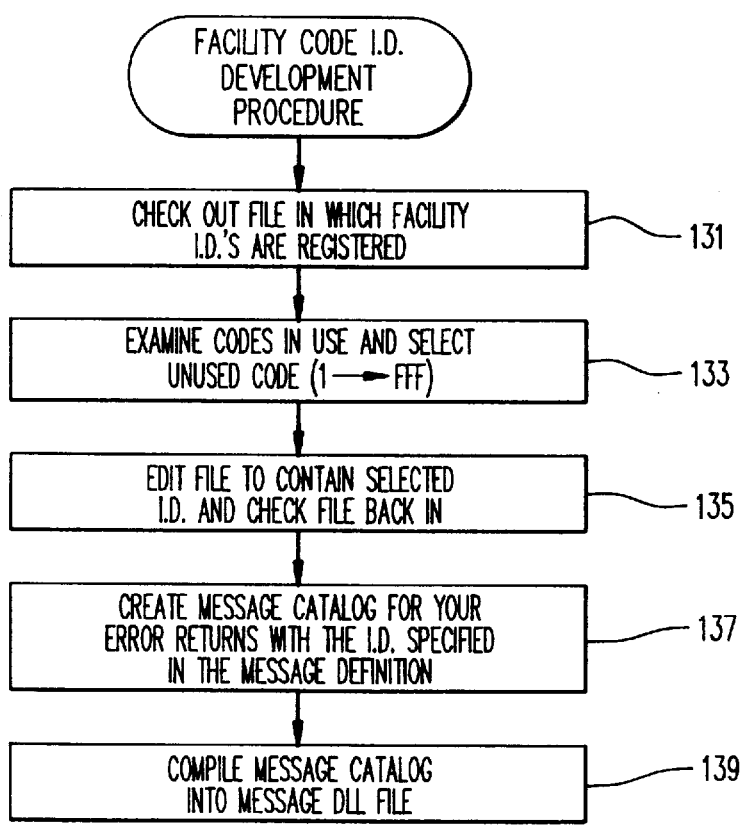
FIG. 3 is a flow diagram of the facility code I.D. development procedure.

Since each loosely coupled service application needs a unique facility code, the developer of the application obtains one using the steps set forth in FIG. 3. The facility code ID development procedure is set forth in FIG. 3 which initially checks out the file in which the facility ID's are registered 131. Thereafter, the codes are examined to determine those in use and an unused code (1→FFF) 133 is selected. The file is edited to contain selected ID's and checked back in 135. The message catalog for the application error returns with the ID specified in the message definition 137 which is created using a text editor and the message catalog is compiled into the message DLL file 139.

When the server application is installed on the system, several areas of the Windows NT® registry are updated to provide information about the application. The portion of the registry used to provide information about the application to the event viewer is described in the Windows NT event logging documentation which is incorporated herein by reference. This information maps source name to DLL files. This invention includes updates to an additional area of the registry which provides the mapping of facility codes to message DLL files.

Figure 4A:
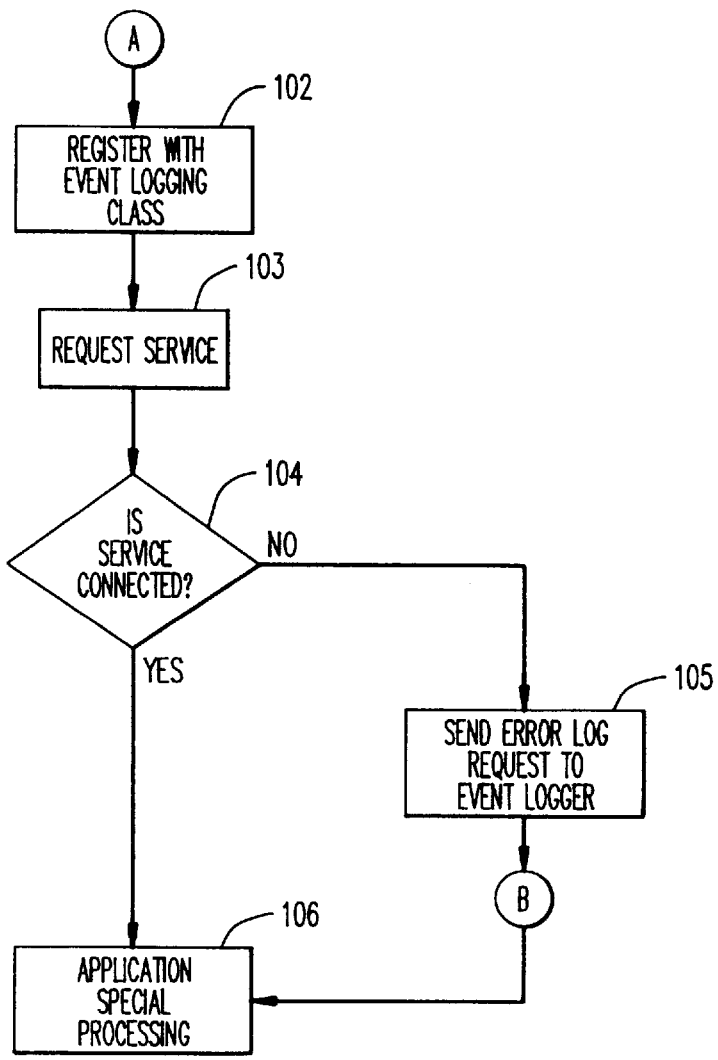
FIGS. 4a and 4b are flow diagrams of the operation of the event logger routine of FIG. 2.
Figure 4B:
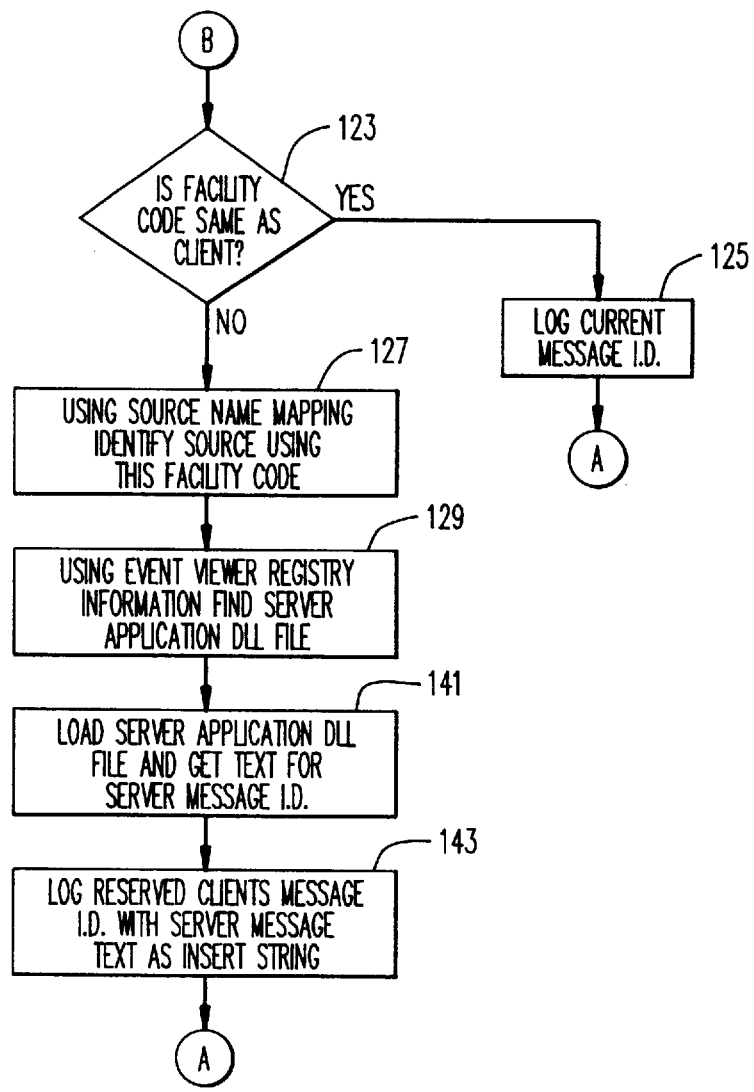

Referring to FIGS. 4A and 4B, an operator initiates client application 101 written to operate in the client-server environment utilizing the HSI event logging class to provide recording of events. As part of the application's start-up procedure, it registers itself with HSI event logging class 102 by calling the class's registration method and provides its source name. Having done this, it receives a handle to the vent log which may be used to perform later logging requests.

The application then continues execution, possibly interacting with the user, and calling upon one or more service providers 103. When one of the requested services fails 104, the application must deal with the error. In order to report the error, it calls the event logging class 105 to have the error recorded in the event log.

The event logging class receives the request to log the error number from 105 and processes it according to the subroutine set forth in FIG. 4B, wherein the error message system of the present invention checks the facility code portion of the error number to determine whether the facility code is the same as the client application 123. If the facility code is the same as the client application, then the current message ID is logged 125 and returned to subroutine in FIG. 4A. If the facility code differs from the client application, then the system using source name mapping identifies the source using the facility code 127. Then, using the event viewer registry information the system is capable of finding the server application DLL file 129.

These message DLL files are then loaded and the text associated with the error message from 141, i.e., the service in which the error message originated, is retrieved. The event logger then creates an error log entry using the applications reserved error number and records the error text in the log file 143. Thereafter, the subroutine of FIG. 4B returns to FIG. 4A wherein the application special processing step 106 takes place and the request for service step 103 starts the process all over again.

What is claimed is:

1. An event management system for identifying and logging event information for a plurality of coupled subsystems, said system comprising:

means for reporting an error message in response to an occurrence of a particular event;

means, responsive to receiving said error message, for identifying a source of said error message from a plurality of coupled subsystems;

means for obtaining detailed error information for said error message at a time frame when said particular event occurs, according to said source of said error message;

a service routine which is capable of receiving logging event information from a particular subsystem and handling a logging operation of another subsystem; and means for providing said detailed error information to an event viewer.

2. The event management system of claim 1 wherein said event message corresponds to an event type that includes at least one event type selected from the group consisting of: an information event type, a warning event type and an error event type.

3. The event management system of claim 2 wherein said event type is an error event type used to report a non-recoverable problem.

4. The event management system of claim 1 further comprising a definition table that defines a relationship between an identification of a particular subsystem and a message catalog associated with said particular subsystem.

5. The event management system of claim 4 wherein said message catalog includes a special event message for identifying logging information that does not originate from said particular subsystem.

6. A storage media for identifying and logging event information for a plurality of coupled subsystems, said storage media comprising:

means for reporting an error message in response to an occurrence of a particular event;

means, responsive to receiving said error message, for identifying a source of said error message from said plurality of coupled subsystems;

means for obtaining detailed error information for said error message at a time frame when said particular event occurs, according to said source of said error message;

a service routine which is capable of receiving logging event information from a particular subsystem and handling a logging operation of another subsystem; and a means for providing said detailed error information to an event viewer.

7. The storage media of claim 1 wherein said event message corresponds to an event type that includes at least one event type selected from the group consisting of: an information event type, a warning event type and an error event type.

8. The storage media of claim 7 wherein said event type is an error event type used to report a non-recoverable problem.

9. The storage media of claim 6 further comprising a definition table that defines a relationship between an identification of a particular subsystem and a message catalog associated with said particular subsystem.

10. The storage media of claim 9 wherein said message catalog includes a special event message for identifying logging information that does not originate from said particular subsystem.

11. A method for identifying and logging event information for a plurality of coupled subsystems, said method comprising the steps of:

(a) receiving an error message in response to an occurrence of a particular event;

(b) identifying a source of said error message from said plurality of coupled subsystems;

(c) obtaining detailed error information for said re message at a time frame when said particular event occurs, according to said source of said error message;

(d) receiving logging event information from a particular subsystem and handling a logging operation of another subsystem; and (e) providing said detailed error information to an event view.

12. The method as recited in claim 11 wherein said step of obtaining retrieves said detailed error information from said source of said error message.

13. The method as recited in claim 11 wherein said step of identifying further identifies an address, associated with said source, for retrieving said detailed error information, said step of obtaining retrieving said detailed error information through the use of said address.

* * * * *